United States Patent Office 2,966,505
Patented Dec. 27, 1960

2,966,505
PREPARATION OF ORGANIC TITANIUM COMPOUNDS

Frank W. Lane, Elkton, Md., assignor to E. I. du Pont de Nemours and Company, Wilmington, Del., a corporation of Delaware No Drawing. Filed Aug. 24, 1956, Ser. No. 605,949

12 Claims. (Cl. 260—429.5)

This invention pertains to the preparation of organic compounds of titanium. More particularly it relates to the reaction of titanium halides with organic esters of carboxylic acids and their resulting products.

The reaction between titanium tetrachloride and alcohol to form titanium esters is well known. The most used and best procedures employ acid acceptors such as amines to promote the reaction. More recently ammonia has been very successfully used. These alkyl titanates, such as tetraisopropyl titanate, have many uses among which is the reaction with fatty acids such as stearic acid to produce acyl titanates which may be defined as compounds containing the structure

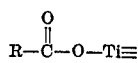

In this process the alkyl titanate is first prepared from titanium tetrachloride and then reacted with the organic acid. Alcohol is driven off and the product titanium compound is separated from unreacted acid.

According to another method, titanium tetrachloride may be reacted directly with a fatty acid yielding an acyl titanate and hydrogen chloride. The latter is difficult to handle in the usual industrial equipment due to corrosion.

I have now discovered a new reaction in which various halotitanates, especially the chlorides, react with organic carboxylic esters. This new reaction has certain characteristics which are advantageous with respect to other reactions producing acyl titanates.

The object of this invention is, therefore, to provide a new and simplified route to the preparation of acyl titanates. Another object is to apply this reaction to the synthesis of valuable titanium organics as well as coproduct organic halides. Still another object is to provide new polymeric organo-metallates and a method for preparing them.

These objects and others are attained by this invention which comprises mixing and reacting a halide of quadrivalent titanium, broadly classed as an anfluoridous halotitanate, with an organic ester of a carboxylic acid. Of the halides of atomic number greater than 9 the chloride is preferred. More specifically, it comprises forming acyl titanates and anfluoridous aliphatic halides by mixing and reacting under substantially anhydrous conditions at temperatures in the range of from 100° C. to as high as 300° C. and preferably from 100 to 200° C., while providing protection against atmospheric oxidation, a chloride, bromide or iodide of quadrivalent titanium with an organic ester of a monobasic or dibasic carboxylic acid and continuing the reaction until carboxylic ester linkages are broken and an organic halide, derived from an alcohol portion of the organic ester, and an acyl titanate, derived from the acid portion of the ester, are formed. Usually it is desirable to heat the reaction mixture at temperatures sufficiently high to separate vapors of the volatile organic halide formed, although it is not essential to the invention to separate the halide product from the acyl titanate.

In a specific application of this invention methyl stearate may be reacted with titanium tetrachloride to yield methyl chloride and stearoyl titanate. The theoretically complete reaction would be indicated by the equation

However, it is believed that intermediate reactions such as the following occur.

On heating this product, the distearoyl dichlorotitanate may polymerize with formation of stearoyl chloride and a stearoyl chloropolytitanate

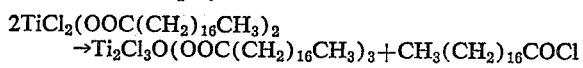

Then the initial reaction may continue to occur, removing more chlorine from the titanium, producing more stearoyl titanate linkages and methyl chloride. Also higher polymers may be obtained by treatment of the acyl chlorotitanates with water which will hydrolyze and condense them, through loss of HCl and formation of

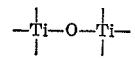

linkages, to net work or linear polymers referred to as polytitanates.

These equations illustrate, in a very limited way, the scope of the reactions which may be involved in this discovery. Most likely mixtures of products are obtained, wherein the initial titanate product compounds may be of several of the possible types or structures, and these may then be condensed to polymers or react further with organic ester.

The carboxylic acid esters preferred for use in this invention are of the type indicated by the following formulae, RCOOR", and R"OOC(R')$_n$COOR''', in which R is a univalent hydrocarbon radical of aliphatic, aryl, aralkyl, or alkaryl character, R' is any bivalent hydrocarbon radical preferably of aliphatic, cycloaliphatic, aryl or alphyl structure, R" and R''' are univalent aliphatic, aryl, aralkyl or alkaryl hydrocarbon radicals, and $n$ is an integer from 0 to 1 inclusively.

Various organic carboxylic esters may be used in my novel reaction. The simpler and more common esters include methyl, ethyl, propyl, isopropyl, benzyl, phenyl, butyl, octyl, allyl, etc., esters of the carboxylic acids, preferably of acids containing from 1 to 18 carbon atoms, such as formic, acetic, propionic, butyric, valeric, palmitic, stearic, etc., and the corresponding olefinic acids, preferably those containing from 3 to 20 carbon atoms, examples of which include oleic, linoleic, acrylic, methacrylic, crotonic, abietic, etc. The class of esters includes for example methyl stearate, octyl butyrate, isopropyl oleate, methyl methacrylate, allyl propionate, hexyl benzoate, etc.

The corresponding esters of the dibasic acids are particularly valuable in this process. Some of these are dimethyl sebacate, dibutyl diphenate, diethyl carbonate, diisopropyl terephthalate, dibenzyl adipate, dimethyl oxalate, diphenyl carbonate and dibenzyl malonate.

The titanium halides useful in this invention are anfluoridous (fluorine free) halotitanates including both monomers and polymers. It may be a monomeric halotitanate having a general structure TiX$_x$(OR)$_{4-x}$ in which X is chlorine, bromine, or iodine and R is a hydrocarbon radical preferably aliphatic and usually alkyl and $x$ is an integer from 1 to 4 inclusively, as well as the halopolytitanates in which titanium is bonded to at least one anfluoridous halogen with several titanium atoms present in each molecule linked to each other by oxygen. Such polymers are often formed during the course of the reaction, as illustrated by the distearoyl dichlorodititanate in the foregoing equation, and will continue to react with additional carboxylic esters according to this invention. The halopolytitanates are also formed from the halomonotitanates, such as $TiX_x(OR)_{4-x}$, by known reaction with a limited amount of water i.e. less than that required to hydrolyze all the Ti—X bonds. Any quadrivalent titanate, including $TiCl_4$ containing the Ti—X bond is believed to be reactive under the method of this invention. Other members illustrating the anfluoridous halotitanates are: $TiCl_4$, $TiI_2(OEt)_2$, [—TiCl(OR)—O—]$_x$, bromo polytitanates such as $(TiOBr_2)_x$, $TiBr_4$, etc. The dichloro titanates are particularly interesting because of their bifunctional character with respect to this new reaction resulting in linear polymers.

The acryl titanates produced by this invention are characterized by the structure

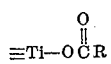

which is illustrative of the fact that these compounds comprise those in which at least part of the titanium valences are satisfied by the

radical where R is the hydrocarbon portion of the carboxylic acid component of the organic ester, previously defined, and also embraces R' as defined and the other half of an oxalate radical. The remaining valences of the Ti are satisfied by halogen or oxygen, the oxygen being also bonded to a hydrocarbon or acyl radical, or to another Ti in the case of polytitanates.

To a clearer understanding of the invention, the following specific examples are given. These are merely illustrative and not to be construed as limiting the underlying principles of my invention.

*Example I*

108 gms. of methyl oleate were mixed and reacted with 34.5 gms. of titanium tetrachloride in a distilling flask. The flask contained a thermometer and was connected through a water-cooled reflux condenser to a Dry Ice trap at —75° C. Agitation of the reaction mixture was obtained by bubbling in dry nitrogen. The temperature of the mixture rose spontaneously to about 60° C. When the initial reaction had subsided, heat was applied for two hours reaching a maximum of 160° C. 14 cc. of a clear liquid distilling off between 100° C. and the final temperature and identified as methyl chloride (B.P. —24 to —20° C.) was collected in the coldtrap. The yellow waxy residue showed slight decomposition or separation of volatile above 200° C. and 3 mm. pressure. A small sample of the final residue was found substantially insoluble in water and only after long contact did the water become slightly acid (pH 4) indicating substantial absence of any titanium tetrachloride. No appreciable amounts of acidic material were detected in the cold trap or the off-gases. The waxy product was examined without further purification. On analysis it was found to contain 4.5% Ti and 3.06% Cl. Its molecular weight, as determined by freezing point depression of benzene, was 4800. The product comprised oleoyl polytitanate with some residual chlorine.

*Example II*

Diisopropyl dichlorotitanate was prepared by reacting equimolar portions of $TiCl_4$ and titanium tetraisopropyl titanate. One mol of this product, 238 gms., was dissolved in cyclohexane and added to one mol, 318 gms. of diisopropyl sebacate dissolved in cyclohexane. The addition was made while the latter solution was refluxing under a fractionating column. The solvent was then distilled off to a cold receiver. After removing most of the solvent, the residue was gradually heated further to a final temperature of about 200° C. under an atmosphere of dry nitrogen producing further distillate and leaving a tough solid when cooled to room temperature which was insoluble in water and contained 13% Ti. The condensed solvent was redistilled through a fractionating column and isopropyl chloride equivalent to about 80% of the theoretical amount was recovered. The polymer product is characterized as a linear poly sebacyl diisopropyl titanate and make up essentially of the unit:

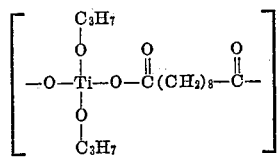

This product, dissolved in a suitable volatile non-aqueous solvent such as xylene, furnishes a useful coating composition which, on application to a surface such as glass, wood, metal, etc. forms a tough adherent coating. This polymer and those of other dibasic acid ester products may be used for extrusion into filaments or casting into films.

*Example III*

One mol of dimethyl dichlorotitanate $(CH_3O)_2TiCl_2$ was reacted with one mole of dimethylterephthalate dissolved in diethyl Cellosolve. After mixing and refluxing for a few minutes the solvent was allowed to distill off. Methyl chloride, 1.8 mols, was evolved and condensed in a Dry Ice trap. The residue was heated to 200° C. under vacuum to remove residual volatile by-products and reactants after which it cooled to a tough clear polymer insoluble in water and containing 14.5% Ti. This corresponds quite closely to poly terephthaloyl dimethyl titanate having linear structure comprised essentially of the unit:

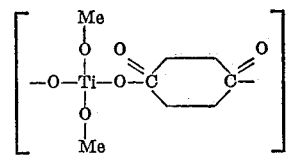

Other dibasic or polybasic acids can be used in preparing the polymeric substances of this invention. Thus, in addition to the polymer of Example II, the analogous polymers such as polyadipyl diisopropyl titanate can similarly be prepared.

In general, this reaction may be used to prepare novel polymers, such as linear poly dioyl dialkyl titanates, containing the repeating units:

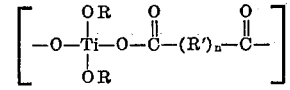

in which R is an aliphatic radical, R' is a bivalent hydrocarbon radical, and n is an integer from 0 to 1 inclusively. The expected monomer-derived end groups may terminate the chains, e.g. the OR'' or OR''' groups of the reactant ester may remain on the carboxylic end of the terminal polymer unit while a halogen atom, X, may satisfy the titanate end of a terminal unit, e.g.

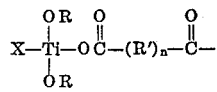

Related chain stopping unifunctional radicals such as $(RO)_3TiO$— may also be used in accordance with general principles of the polymer art.

During the progress of this polymerization reaction the initially formed units as well as the intermediate polymers having structures such as:

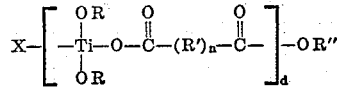

are further reacted, under the continuing effect of heat, with each other and with more of the initial reactants to increase the degree of polymerization (d) by condensation through formation of R''X or R'''X.

The linear polymeric products of this invention, particularly the poly dioyl dialkyl titanates, may be used as coating materials as suggested in Example II. After the application of a film of the polymer to a surface, contact with moisture, such as atmospheric humidity, will cause hydrolysis of the OR groups on the titanium atom which results in cross-linking of the polymer chains to form a more solvent resistant polymer and also enhances adhesion of the coating. They are useful additives to other plastic materials including drying oils to improve hardness or toughness and adhesion.

The reaction has certain advantages over previously known reactions in the field of organo-titanium chemistry. Perhaps one of the most promising advantages is the possibility of utilizing quadrivalent titanium as a bifunctional unit, thus opening the way to linear polymers containing titanium. For example, $TiCl_4$ or $Ti(OR)_4$ and the alkyl chlorotitanates are all quadrifunctional in the previously known reactions with water, organic acids and hydroxy compounds. In the new reaction with esters the chlorotitanates of the type $(RO)_2TiCl_2$ are bifunctional especially when R is the same radical as that occurring in the alcohol portion of the reacting ester. Furthermore, for practical purposes the (RO) groups on the Ti are non-functional since the mere ester-interchange with the organic ester, for example in the case of diesters of adipic and other dibasic acids, does not substantially alter the ester reactant for the present use. A secondary advantage of this process lies in the novel method of forming organic halides. Many of these are valuable by-products of my process but further it affords a simplified method of producing certain chlorides not readily obtained by previous chlorination procedures.

This application is a continuation-in-part of my application, Serial Number 281,469, filed April 9, 1952, now abandoned.

I claim as my invention:

1. The method of preparing acyl titanates and organic halides which comprises mixing and heating at temperatures in the range of from 100° C. to 300° C. and under substantially anhydrous conditions, an organic ester having a formula selected from the group consisting of R''OOCR and R''OOC(R')$_n$COOR''' in which R, R'' and R''' are univalent hydrocarbon radicals, R' is a bivalent hydrocarbon radical and n is an integer of from 0 to 1 inclusively, with an anfluoridous halotitanate in which at least one Ti—X bond is present and where X is the halogen atom, and in which the remaining titanium valences are each satisfied by bonds through oxygen to a member selected from the group consisting of titanium, hydrocarbon, and RC=O radicals in which R is a hydrocarbon group, and continuing the heating until organic ester linkages are broken and an organic halide, derived from an alcohol portion of said ester, and an acyl titanate, derived from the acid portion of said ester, are formed.

2. The method of preparing acyl titanates and organic chlorides which comprises mixing and heating at temperatures in the range of from 100-200° C. and under substantially anhydrous conditions, titanium tetrachloride with an aliphatic hydrocarbon carboxylic ester and continuing the heating until the ester linkage of said ester is broken and an organic chloride, derived from an alcohol portion of said ester, and an acyl titanate, derived from the acid portion of said ester, are formed.

3. The method of perparing polymeric stearoyl titanate which comprises mixing and heating in the range of from 100° C. to 200° C. and under substantially anhydrous conditions, titanium tetrachloride with methyl stearate and continuing the heating until the ester linkage of said stearate is broken and methyl chloride and a polymeric stearoyl titanate are formed.

4. The method of producing linear poly dioyl titanates which comprises heating together at temperatures in the range of from 100° C. to 300° C. under anhydrous conditions, an organic ester of a dicarboxylic acid having the formula R''OOC(R')$_n$COOR''' in which R'' and R''' are univalent hydrocarbon radicals, R' is a bivalent hydrocarbon radical, and n is an integer from 0 to 1, inclusive, and an anfluoridous dialkyl dihalotitanate, and continuing said heating until ester linkages of said ester are broken and an organic halide, derived from an alcohol portion of said ester, and a poly dioyl titanate product, derived from the dicarboxylic acid portion of said ester, are formed.

5. The method of preparing polymeric sebacyl titanate which comprises mixing and heating at temperatures in the range of from 100° C. to 200° C. under substantially anhydrous conditions, diisopropyl dichlorotitanate with diisopropyl sebacate, and continuing the heating until the methyl sebacate ester linkage is broken and isopropyl chloride and polymeric sebacyl titanate are formed.

6. The method of preparing polymeric adipyl titanate which comrpises mixing and heating at temperatures in the range of from 100° C. to 200° C. under substanitally anhydrous conditions, diisopropyl adipate and diisopropyl dichlorotitanate and continuing the heating until the isopropyl adpate ester linkage is broken and isopropyl chloride and polymeric isopropyl adipyl titanate are formed.

7. The method of preparing a polymeric terephthaloyl titanate which comprises mixing dimethyl dichlorotitanate with dimethylterephthalate under substantially anhydrous conditions, heating the mixture at temperatures in the range of from 100° C. to 200° C. to evolve methyl chloride, and recovering the polymeric terephthaloyl titanate product.

8. A polymeric substance characterized as a poly dioyl titanate having a repeating polymer unit defined by the formula:

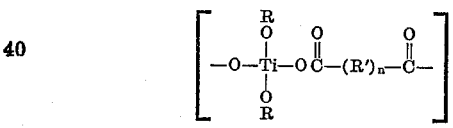

where R is an aliphatic hydrocarbon radical and R' is a bivalent hydorcarbon radical, and n is an integer from 0 to 1 inclusively.

9. Poly sebacyl diisopropyl titanate.

10. Poly adipyl diisopropyl titanate.

11. Poly terephthaloyl dimethyl titanate.

12. The method of preparing acyl titanates and organic halides which comprises mixing an aliphatic hydrocarbon carboxylic ester, and an anfluoridous halotitanate in which at least one Ti—X bond is present, X being the halogen atom, and in which the remaining titanium valences are each, satisfied by bonds through oxygen to a member of the group consisting of titanium, hydrocarbon, and aliphatic hydrocarbon acyl radicals, heating the mixture to temperatures in the range of from 100° C. to 300° C. and continuing said heating until organic ester linkages are broken by reaction with said halotitanate and an organic halide derived from the alcohol portion of said ester, and an acyl titanate, derived from the acid portion of said ester, are formed.

References Cited in the file of this patent

UNITED STATES PATENTS

| | | |
|---|---|---|
| 2,505,259 | Signaigo | Apr. 12, 1950 |
| 2,512,063 | Kreidl et al. | June 20, 1950 |

OTHER REFERENCES

Hummers et al.: J.A.C.S., 74, pp. 139–141, January 1952.

Bradley et al.: J.C.S., 2773–78, July 1952.

"Chem. Abs.," 21, 7396.

"Chemical Abs.," 23, 41965.